(12) United States Patent
Shear

(10) Patent No.: US 6,240,714 B1
(45) Date of Patent: Jun. 5, 2001

(54) WEED TRIMMING DEVICE

(76) Inventor: Charles Shear, 131 Iris Dr., Binghamton, NY (US) 13905

( * ) Notice: Subject to any disclaimer, the term of this patent is extended or adjusted under 35 U.S.C. 154(b) by 0 days.

(21) Appl. No.: 09/307,160

(22) Filed: May 7, 1999

(51) Int. Cl.[7] ................................................. A01D 34/83
(52) U.S. Cl. ............................................. 56/291; 56/290
(58) Field of Search ............................. 56/244, 290, 291, 56/292, DIG. 17; 30/383, 274; 83/661; 172/41, 42

(56) References Cited

U.S. PATENT DOCUMENTS

| Re. 27,511 | * | 10/1972 | Locati | 56/292 |
|---|---|---|---|---|
| 131,580 | * | 9/1872 | Unger | 56/291 |
| 2,514,861 | * | 7/1950 | Hackerott | 56/292 |
| 3,242,659 | * | 3/1966 | Dunlap | 56/244 |
| 3,641,751 | * | 2/1972 | Locati et al. | 56/291 |
| 3,682,012 | * | 8/1972 | Blankenship | 56/291 |
| 3,699,757 | | 10/1972 | Hulburt . | |
| 3,831,358 | | 8/1974 | Marsh et al. . | |
| 3,834,138 | * | 9/1974 | Gibson | 56/290 |
| 4,030,276 | * | 6/1977 | Stecklein | 56/291 |
| 4,164,835 | | 8/1979 | Conte . | |
| 4,341,017 | * | 7/1982 | Janczak | 30/381 |
| 4,656,819 | * | 4/1987 | Pearson | 56/291 |
| 4,884,340 | * | 12/1989 | Newman | 30/122 |
| 5,644,904 | * | 7/1997 | Olinger | 56/292 |

FOREIGN PATENT DOCUMENTS

3623563 * 1/1988 (DE) .

* cited by examiner

Primary Examiner—Robert E. Pezzuto
Assistant Examiner—Nathan Mammen
(74) Attorney, Agent, or Firm—Salzman & Levy

(57) ABSTRACT

A weed trimmer or whacker which has an improved drive belt system. The cutting blades carried by a pulley driven belt have dual cutting edges, so the belt can be reversed after one side of the blades becomes dull. The reversal of the belt allows the other cutting edge to be used, thus effectively doubling the useful life of the belt. The drive system has either a V-shaped belt or a timing belt to reduce the probability of dislodging the belt from about the pulleys, when the cutting blades impinge upon an obstacle.

13 Claims, 5 Drawing Sheets

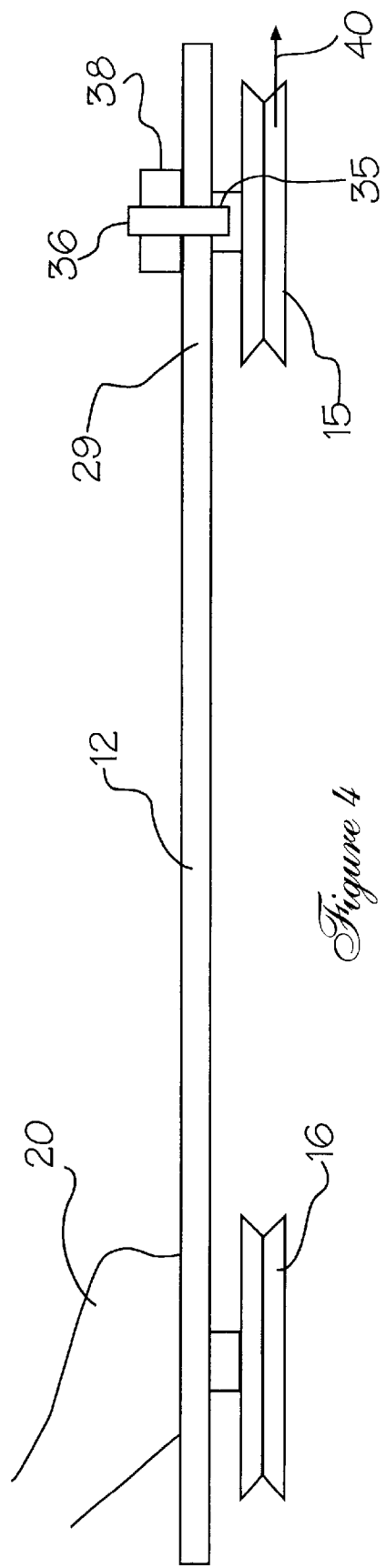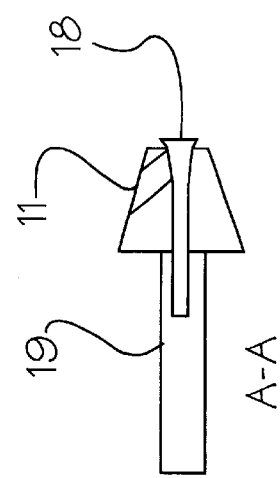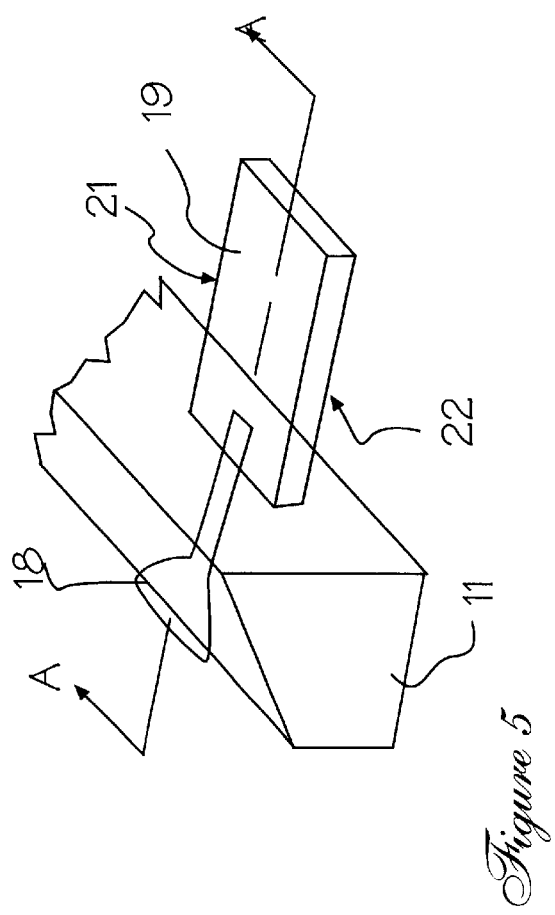

WEED TRIMMING DEVICE

FIELD OF THE INVENTION

The present invention relates to weed trimmers and, more particularly, to a weed trimmer having a belt drive that carries a plurality of double edged cutting blades.

BACKGROUND OF THE INVENTION

In the past, it has been known to fabricate weed trimmers or whackers using belt drives to which a number of cutting blades are attached. The blades rapidly cut grass and weeds as the blades are caused to spin about a moving belt that is stretched between two pulleys. These types of belt drives are shown in U.S. Pat. Nos. 3,699,757, issued to Hulburt on Oct. 24, 1972, for BELT CARRIED CUTTERS AND MOUNTING MEANS THEREFORE; 4,164,835, issued to Conte on Aug. 21, 1979, for GRASS CUTTER; and 3,831,358, issued to Marsh et al on Aug. 27, 1974, for BELT AND CONNECTING MEANS THEREFOR.

One of the problems with blade carrying belt drives is their tendency to throw or damage the drive belt, when the moving blades encounter rigid obstacles. U.S. Pat. No. 3,699,757 teaches that it is useful to pivotally mount the blades to the belt, so that they can deflect when they encounter an obstacle. The deflecting blades are designed to prevent belt damage and dislodgement of the belt from the pulleys.

It has been determined, however, that pivoting blades have several drawbacks. In the first instance, the blades require a complex shape, so the pivotable mounting adds cost and complexity. In the second instance, pivoting blades often fail to cut through dense brush and weeds that are generally thicker than average, because of the adjusted cutting angle.

The current invention seeks to provide a blade cutting belt drive system that has none of the above drawbacks.

The belt drive of the present invention has rigidly mounted blades that are secured to the belt by a set screw. The set screw allows for ease of removal of a damaged blade and quick replacement of a new blade.

The belt drive of the current invention features blades that are sharpened on both front and back edges. The purpose of having dual sharpened edges is to allow a worn bladed belt to be reversed to provide a sharp bladed belt. In this manner, the belt of the invention lasts approximately twice as long as does a conventional belt.

In order to prevent the belt from being torn off, or dislodged from the pulleys, the present invention uses a timing, or V-shaped belt. The V-shape creates a more positive belt engagement and prevents the belt from being dislodged or from slipping off of the pulleys. Timing belts act as gears, whose teeth engage the mating teeth of the pulley drives. The positive engagement of the timing belt about the pulleys prevents the belt from being torn therefrom.

The inventive weed trimmer also features a simple adjustment for tensioning the belt about the pulleys. The shaft of the forwardly mounted pulley is rotatably anchored to the frame by a machine screw, which is tightened in place by a collar nut. The machine screw rides within a slot of the weed trimmer frame, so that the rotatable pulley can be pulled forward to adjust the belt tension, and then fixedly secured in place with respect to the frame.

The weed trimmer of this invention also comprises a cutting blade on a nose portion, which cutting blade can sever grass or weeds that lie close to a wall or other structure, or which cannot be reached by the cutting blades of the belt. The nose portion is angled for directing grass, close to the aforementioned wall or structure, into the cutting blades of the belt.

A cowling is provided that has an outwardly flowing surface for directing clippings away from the operator.

SUMMARY OF THE INVENTION

In accordance with the present invention, there is provided a weed trimmer featuring an improved drive belt system. The weed trimmer comprises an elongated frame upon which is mounted a pair of spaced-apart pulleys. Each pulley is rotatably mounted on a respective distal end of the elongated frame. A motor supported upon the elongated frame rotatively drives one of the pulleys. The pair of pulleys is rotatably connected via a continuous belt that wraps around the pulleys. The continuous belt carries a plurality of cutting blades that are approximately evenly spaced along the outer periphery of the belt. The cutting blades are removably affixed to the belt by fasteners. The blades project from the belt, and have forward and rearward cutting surfaces disposed thereon.

A handle is secured to the frame for transporting, and for directing the weed trimmer into the grass and brush. A power cord runs through the handle to the motor, for supplying powering thereto. A cowling surrounding the rear portion of the frame has a sloping surface for directing clippings away from the operator of the device.

The belt comprises either a timing belt, or a V-shaped belt. The V-shaped belt creates a positive belt engagement about the pulleys, and prevents the belt from being dislodged, or from slipping off of the pulleys. The timing belt acts as a loop of gears, whose teeth engage the mating teeth of the pulley drives. The positive engagement of the timing belt about the teeth of the pulleys prevents the belt from being dislodged therefrom.

A simple adjustment for tensioning the belt about the pulleys features an elongated slot disposed in the frame. The shaft of the forwardly mounted pulley is anchored to the frame by a machine screw which projects through the elongated slot. The machine screw is tightened in place by a collar nut, thus securing the forward pulley for rotational movement about the front portion of the frame. The machine screw rides within a slot of the weed trimmer frame, so that the pulley can be pulled forward to adjust the belt tension.

It is an object of this invention to provide an improved weed trimmer.

It is another object of the invention to provide a weed trimmer whose drive belt is positively secured for rotation about the pulleys of the system, so that the drive belt is less likely to become dislodged when the blades hit an obstacle.

It is a further object of this invention to provide cutting blades for a belt driven weed trimmer, whose forward and rearward surfaces present cutting surfaces, so that the belt can be reversed after the blades wear in one direction.

It is yet another object of the invention to provide a belt drive for a weed trimmer that is easily tensioned and secured about the frame.

BRIEF DESCRIPTION OF THE DRAWINGS

A complete understanding of the present invention may be obtained by reference to the accompanying drawings, when considered in conjunction with the subsequent detailed description, in which:

FIG. 4 illustrates a sectional view of the weed trimmer shown in FIG. 2, taken along lines B—B;

FIG. 5. depicts a portion of the V-belt of the drive system, showing the securement of a typical cutting blade;

FIG. 6 shows a sectional view of the V-belt depicted in FIG. 5, taken along lines A—A;

For purposes of clarity and brevity, like elements and components will bear the same designation and numbering throughout the figures.

DESCRIPTION OF THE PREFERRED EMBODIMENT

Generally speaking, the invention features a weed trimmer having an improved drive belt system. The cutting blades carried by a pulley driven belt have dual cutting edges, so the belt can be reversed after one side of the blades becomes dull. The reversal of the belt allows the other cutting edge to be used, thus effectively doubling the useful life of the belt. The drive system comprises either a V-shaped belt, or a timing belt to reduce the probability of dislodging the belt from about the pulleys, when the cutting blades impinge upon an obstacle.

Figure 1:
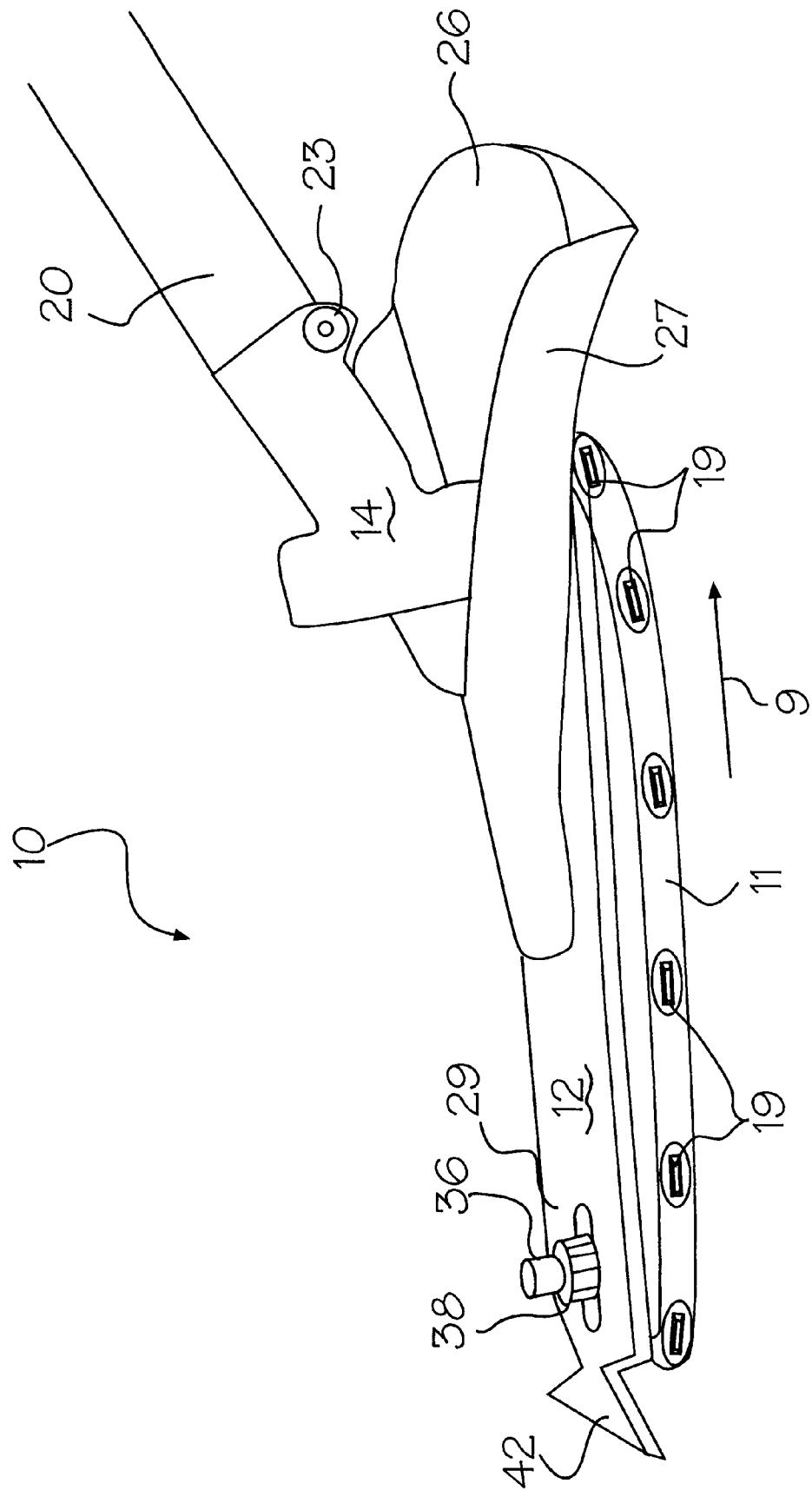
FIG. 1 illustrates a perspective view of the weed trimmer of this invention.
Figure 2:
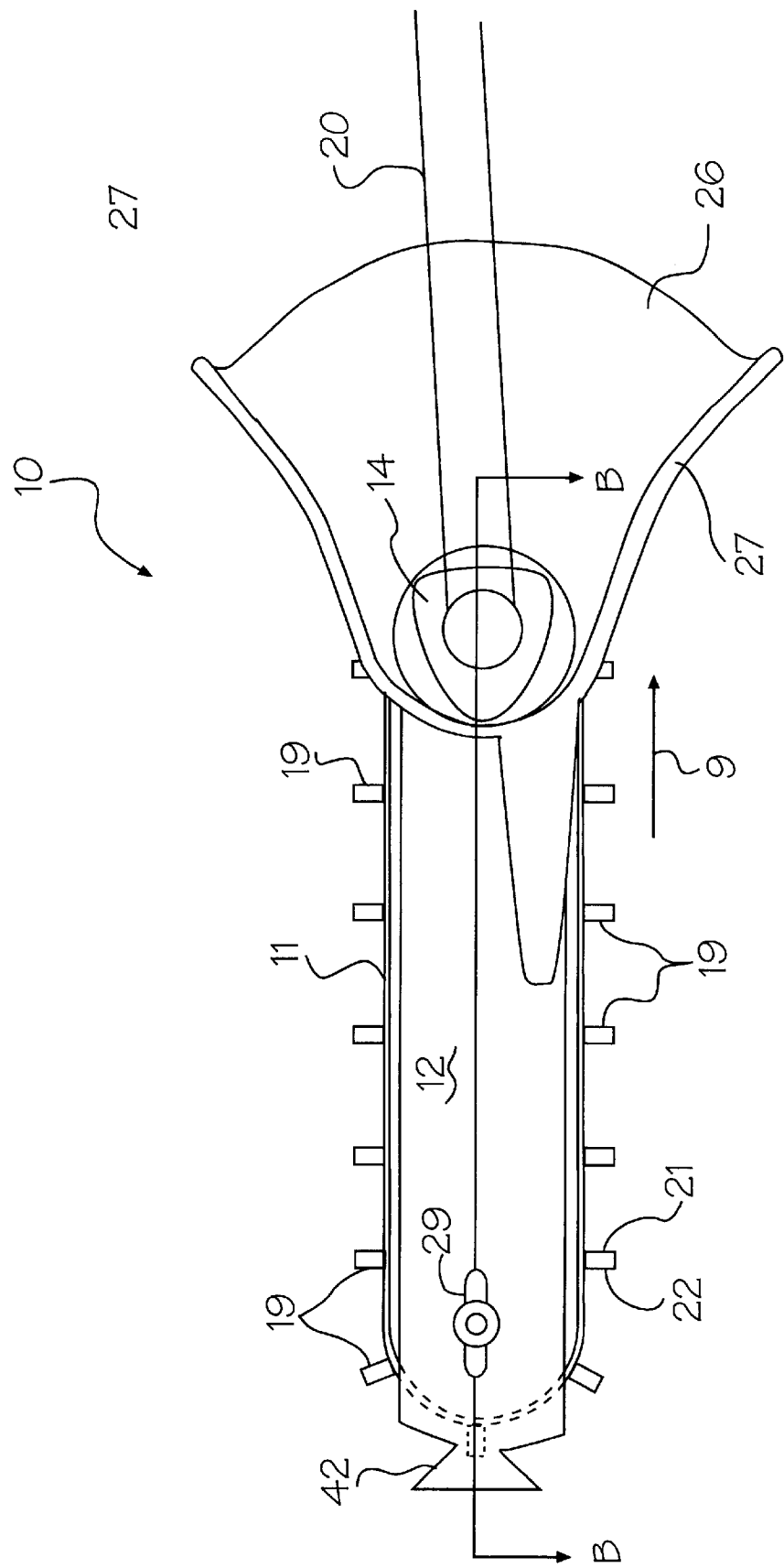
FIG. 2 depicts a top view of the weed trimmer shown in FIG. 1.
Figure 3:
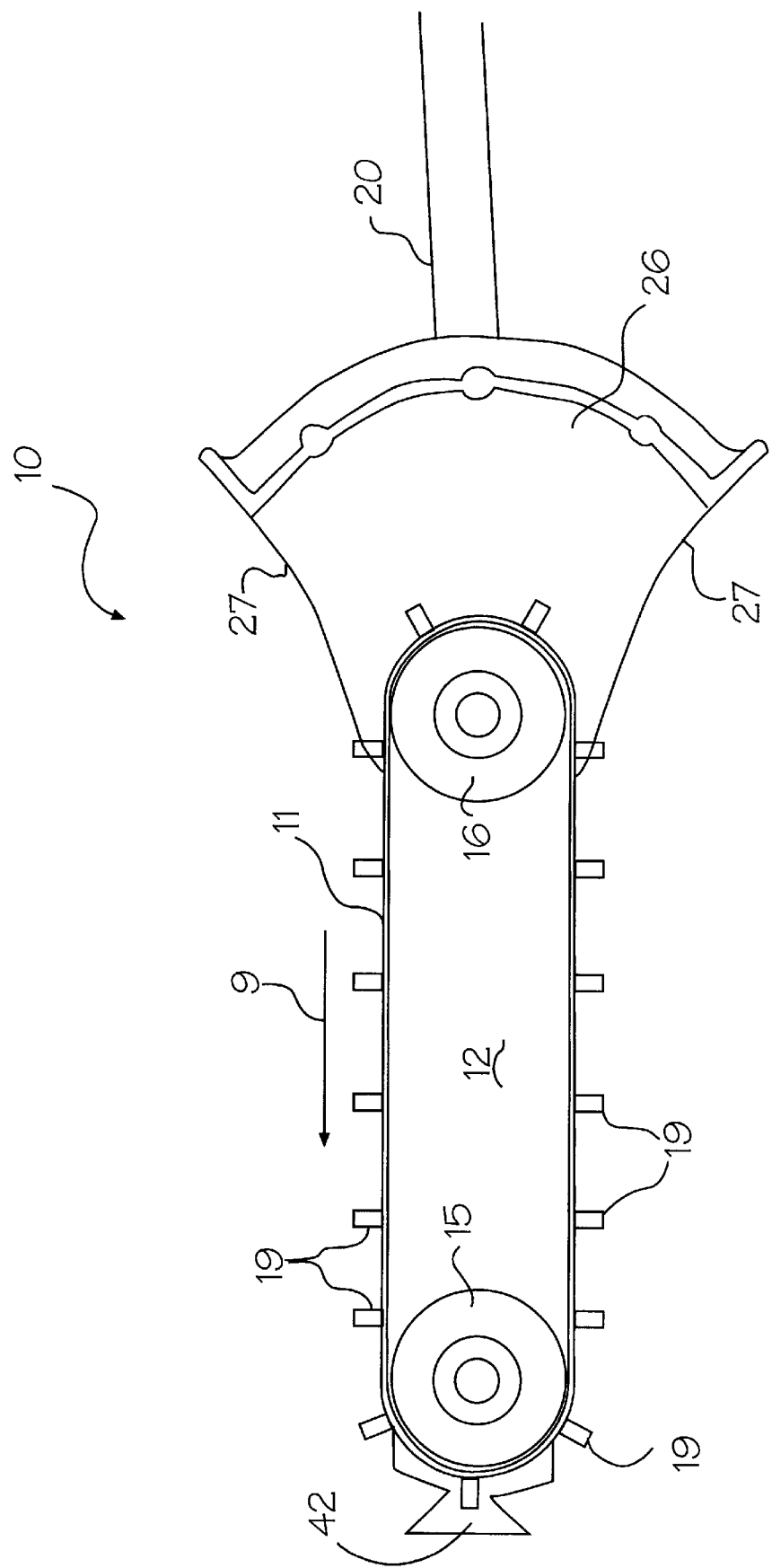
FIG. 3 shows a bottom view of the weed trimmer depicted in FIG. 1.

Now referring to FIGS. 1 through 3, the weed trimmer 10 of this invention is illustrated in perspective view. The weed trimmer 10 comprises an elongated frame 12 upon which is mounted a pair of spaced-apart pulleys 15 and 16, respectively, as seen in FIGS. 3 and 4. Each of the pulleys 15 and 16 is rotatably mounted on a respective distal end of the elongated frame 12. Pulley 15 is mounted at the front end and pulley 16 is rotatably mounted at a rear portion of the frame 12. The pulleys 15 and 16 support the belt 11 for rotation (arrow 9) about the frame 12. A motor (not shown) is internally housed in the handle cover 14, and is supported upon the elongated frame 12. The motor engages and rotatively drives the rear pulley 16. The respective pair of pulleys 15 and 16 is rotatably connected via a continuous belt 11 that wraps around the pulleys 15 and 16. The continuous belt 11 carries a plurality of cutting blades 19 that are approximately evenly spaced along the outer periphery of the belt 11.

Referring to FIG. 5, the V-belt 11 is shown in partial view. A cutting blade 19 (typical) is removably affixed to the belt 11 by a screw fastener 18, as is also shown in the sectional view of FIG. 6. The blades 19 project from the belt 11, and have forward and rearward cutting surfaces 21 and 22, respectively (FIG. 2). The belt 11 is reversible, so that as the edge 21 wears out, the belt 11 can be flipped over, and the cutting edge 22 can be used. This effectively doubles the operational life of the belt 11.

A handle 20 is secured to the frame 12 by a screw 23 that tightens the handle cover 14 about the handle 20, as shown in FIG. 1. A power cord (not shown) runs through the handle 20 to the motor, for supplying power thereto. A cowling 26 projects from the rear portion of the frame 12, and has sloping surfaces 27 for directing clippings away from the operator of the weed whacker 10.

Figure 8:
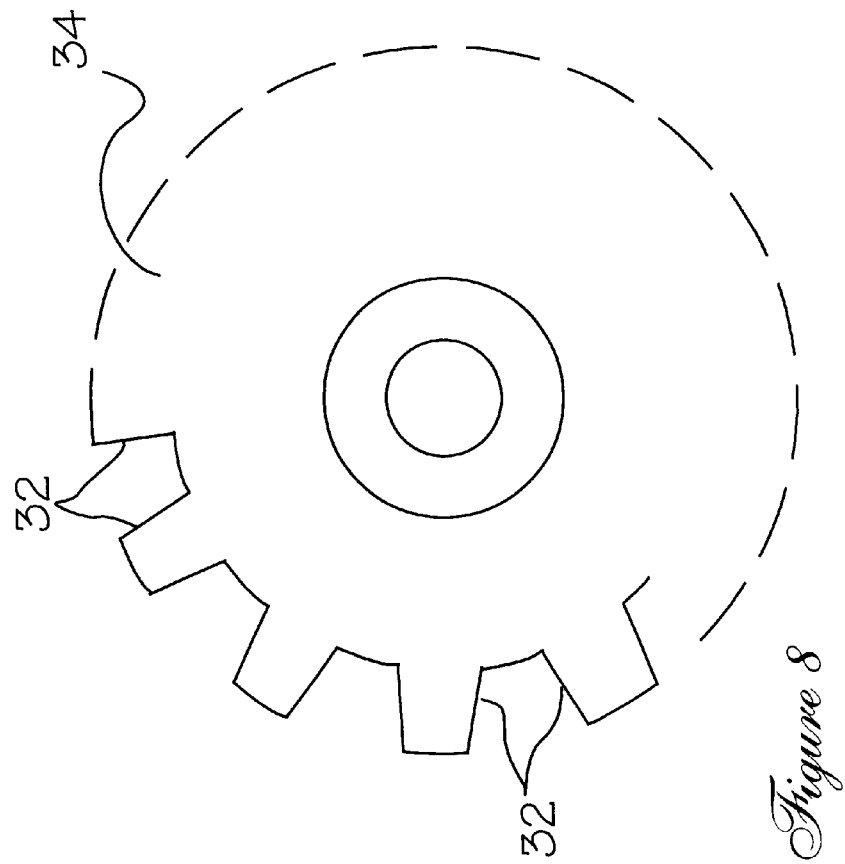
FIG. 8 shows a top, partial view of a timing belt pulley.
Figure 7:
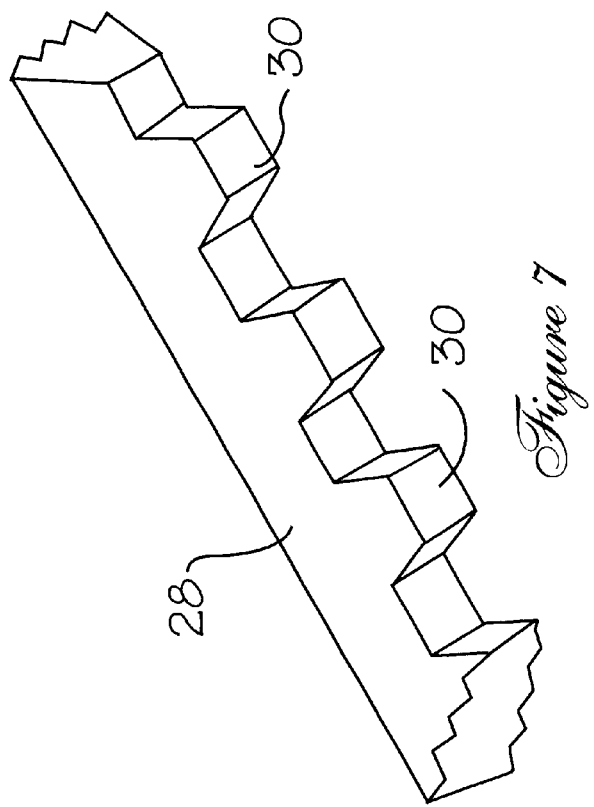
FIG. 7 illustrates a portion of a timing belt for use in the drive-belt system of this invention.

The belt comprises either a timing belt 28, shown in FIG. 7, or a V-shaped belt 11, shown in FIGS. 5 and 6. The V-shaped belt 11 creates a positive belt engagement about the pulleys 15 and 16, and prevents the belt 11 from being dislodged, or from slipping off of the pulleys 15 and The timing belt 28 acts as a loop of gears, whose teeth 30 engage the mating teeth 32 of the timing pulleys 34. A typical timing pulley 34 is shown in FIG. 8. The positive engagement of the timing belt 28 about the mating teeth 32 of the timing pulleys 34 prevents the belt 28 from being dislodged therefrom.

A simple adjustment for tensioning the belt 11 about the pulleys 15 and 16 features an elongated slot 29 disposed in the frame 12, shown in FIGS. 1, 2, and 4. The shaft 35 of the forwardly mounted pulley 15 is anchored to the frame 12 by a machine screw 36, which projects through the elongated slot 29, and is captured by the tightening collar nut 38. The machine screw 36 is tightened and locked in place by a collar nut 38, thus securing the forward pulley 16 for rotational movement about the front portion of the frame 12. The machine screw 36 rides within the slot 29 of the weed trimmer frame 12, so that the pulley 16 can be pulled forward (arrow 40, FIG. 4) to adjust the belt tension.

The front end of the elongated frame 12 comprises a double edged cutting blade 42, shown in FIGS. 1 through 3. The blade 42 is useful in cutting grass or weeds that are immediately adjacent the side of a house or fence, and that cannot be reached by the belt drive. The front end of the frame 12 comprises a double-angled guide that is useful for directing the grass or weeds, proximate a wall or other structure, into the cutting blade 42.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A hand held, and hand supported weed trimmer having a belt drive carrying a plurality of cutting blades, said belt drive including pulleys and a belt that is positively engaged by said pulleys to prevent dislodgement and slipping thereof, said weed trimmer comprising:

an elongated frame;

a handle attached to said elongated frame for hand supporting said frame above ground level;

a driving belt disposed upon said elongated frame and carrying a plurality of blades fixedly disposed on a periphery thereof by a removable fastener so that worn or damaged blades can be easily replaced, said plurality of blades each having dual cutting edges, said driving belt being V-shaped and reversible, so that after one cutting edge of said plurality of blades is used, said belt can be reversed, and the unused edge of each of said plurality of blades can be used, whereby the operational life of said driving belt is effectively doubled, and further whereby the V-shape of said driving belt creates a positive belt engagement and prevents the driving belt from slipping and from being dislodged;

a pair of spaced-apart pulleys which supports said driving belt for rotation about said elongated frame; and drive means supported by said elongated frame for driving one of said pair of pulleys in order to rotatively drive said driving belt.

2. The weed trimmer in accordance with claim 1, further comprising a cowling disposed upon a rear portion of said elongated frame, said cowling having surfaces for deflecting clippings discharged by said plurality of blades.

3. The weed trimmer in accordance with claim 1, further comprising a stationary cutting blade mounted to said elongated frame about a front end thereof.

4. The weed trimmer in accordance with claim 1, further comprising means defining a slot disposed in said elongated frame, and wherein a shaft for supporting one of said pair of pulleys for rotation comprises a fastener that is movably disposed in said slot, and a tightening nut disposed about said fastener for locking said shaft in position with respect to said elongated frame, whereby tension in said driving belt can be adjusted by moving the fastener with respect said slot and tightening said locking nut.

5. The weed trimmer in accordance with claim 1, wherein said driving belt comprises a timing belt.

6. A hand held, and hand supported weed trimmer having a belt drive carrying a plurality of cutting blades, a belt drive including pulleys and a belt that is positively engaged by said pulleys to prevent dislodgement and slipping thereof, said weed trimmer comprising:

an elongated frame;

a handle attached to said elongated frame for hand supporting said frame above ground level;

a V-shaped driving belt disposed upon said elongated frame for carrying a plurality of blades fixedly disposed on a periphery thereof, said plurality of blades each being secured by a removable fastener to said driving belt, thus allowing said plurality of blades to be removed easily therefrom, and whereby the V-shape of said driving belt creates a positive belt engagement and prevents the driving belt from slipping and from being dislodged;

a pair of spaced-apart pulleys which supports said driving belt for rotation about said elongated frame; and drive means supported by said elongated frame for driving one of said pair of pulleys in order to rotatively drive said driving belt.

7. The weed trimmer in accordance with claim 6, further comprising a cowling disposed upon a rear portion of said elongated frame, said cowling having surfaces for deflecting clippings discharged by said plurality of blades.

8. The weed trimmer in accordance with claim 6, further comprising a stationary cutting blade mounted to said elongated frame about a front end thereof.

9. The weed trimmer in accordance with claim 6, further comprising means defining a slot disposed in said elongated frame, and wherein a shaft for supporting one of said pair of pulleys for rotation comprises a fastener projecting therefrom, said fastener being movably disposed in said slot, and a tightening nut disposed about said fastener for locking said shaft in position with respect to said elongated frame for the dual purpose of adjusting tension in said driving belt by moving the fastener with respect to said slot and tightening said locking nut and for being able to reverse said driving belt upon said pair of pulleys in order to use sharper edges of said dual cutting blades.

10. The weed trimmer in accordance with claim 6, wherein each of said cutting blades has dual cutting edges, said driving belt being reversible, so that after one cutting edge of said plurality of blades is used, said belt can be reversed, and the unused edge of said plurality of blades can be used, whereby the operational life of said driving belt is effectively doubled.

11. The weed trimmer in accordance with claim 8, wherein said driving belt comprises a timing belt.

12. A hand held, and hand supported weed trimmer having a belt drive carrying a plurality of cutting blades, comprising:

an elongated frame;

a handle attached to said elongated frame for hand supporting said frame above ground level;

a driving belt disposed upon said elongated frame for carrying a plurality of blades disposed on a periphery thereof, said plurality of blades each having dual cutting edges and being secured by a removable fastener to said driving belt, thus allowing said plurality of blades to be moved easily therefrom;

a pair of spaced-apart pulleys which supports said driving belt for rotation about said elongated frame;

adjustment means supported by said elongated frame for adjusting tension in said driving belt and for easily removing said driving belt from said pair of spaced-apart pulleys, said adjustment means also providing the dual purpose of accessing said driving belt in order to reverse said belt upon said pair of spaced-apart pulleys and using sharper edges of said dual cutting blades; and drive means supported by said elongated frame for driving one of said pair of pulleys in order to rotatively drive said driving belt.

13. The weed trimmer having a belt drive carrying a plurality of cutting blades, in accordance with claim 12, wherein said elongated frame comprises a guide mounted at a front end thereof, for directing grass or weeds into operative relationship with said plurality of blades.

* * * * *